Jan. 29, 1957
R. J. BROWN
2,779,398
FORCED DRAFT LIQUID FUEL BURNER OF THE
RETORT TYPE, AND HEATING APPARATUS
INCORPORATING THE SAME
Filed June 5, 1953
4 Sheets-Sheet 1
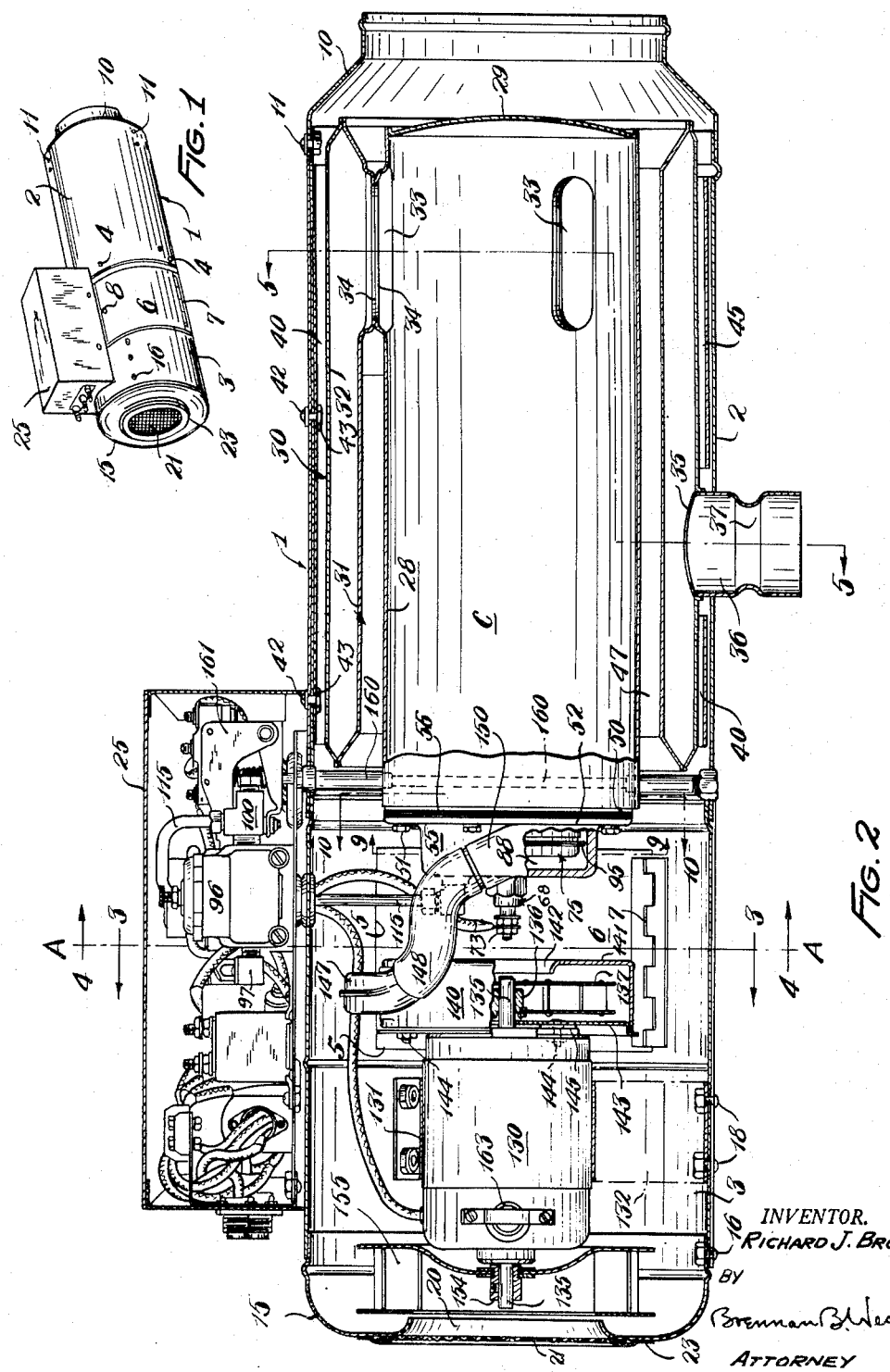
INVENTOR.
RICHARD J. BROWN
BY
Brennan B. West
ATTORNEY Jan. 29, 1957  R. J. BROWN  2,779,398
FORCED DRAFT LIQUID FUEL BURNER OF THE
RETORT TYPE, AND HEATING APPARATUS
INCORPORATING THE SAME
Filed June 5, 1953  4 Sheets-Sheet 2

INVENTOR.
RICHARD J. BROWN
BY
Brennan B. West
ATTORNEY

Jan. 29, 1957  R. J. BROWN  2,779,398
FORCED DRAFT LIQUID FUEL BURNER OF THE
RETORT TYPE, AND HEATING APPARATUS
INCORPORATING THE SAME
Filed June 5, 1953  4 Sheets-Sheet 3

INVENTOR.
RICHARD J. BROWN
BY
ATTORNEY

INVENTOR.
RICHARD J. BROWN
BY
ATTORNEY

United States Patent Office 2,779,398
Patented Jan. 29, 1957

2,779,398

FORCED DRAFT LIQUID FUEL BURNER OF THE RETORT TYPE, AND HEATING APPARATUS INCORPORATING THE SAME

Richard J. Brown, Mentor, Ohio, assignor, by mesne assignments, to Hupp Corporation, Detroit, Mich., a corporation of Virginia Application June 5, 1953, Serial No. 359,868

11 Claims. (Cl. 158—28)

This invention resides in improvements in heating apparatus of the class in which liquid fuel is employed and that is used on automotive conveyances for supplying warm fresh air to the personnel and other compartments of the conveyance where contaminated air would be injurious or objectionable, and that utilizes its hot products of combustion for heating the engine and its appurtenances, thereby to insure easy starting and satisfactory operation in extremely cold weather.

The invention has to do, also, with a unique forced draft liquid fuel burner of the retort type that is especially suitable for use in apparatus of the class above referred to.

One object of the invention is to provide a heater incorporating a liquid fuel burner of the retort type that will operate satisfactorily in any position, thus permitting selection of a location and an arrangement of the heater best suited to the requirements of a particular installation, having regard for both heat distribution and accessibility for inspection and servicing.

Another object is to provide a construction for heaters of the aforesaid class that requires no changes or adjustments to adapt it to the many positions in which it is capable of being used. For example, without adjustment or change, the heater may be arranged in an upright position, in an inverted position, or in any position between these two extremes.

Another object of the invention is to provide heating apparatus of the above mentioned class that operates satisfactorily under the most unfavorable weather conditions, and in sub-zero temperatures as low, for example, as minus 65° to 70° F.

Another object is to provide a burner of the character aforesaid that is equipped with an electrical igniter and so constructed as to render ignition positive at all times notwithstanding adverse weather conditions.

Another object of the invention is to provide a forced draft liquid fuel burning apparatus for heating automotive conveyances and their engines, etc. for the purposes already stated and that is thoroughly safe from a health standpoint in that leakage of the products of combustion into the fresh air stream is positively prevented.

Another object is to provide a forced draft liquid fuel burner wherein the combustion air is so controlled, and is so apportioned between the part used as primary air and the part used as secondary air, that a clean efficient flame is produced and effectively distributed throughout the combustion chamber to the end that the maximum heat output is obtained.

Another object of the invention is to provide a retort burner that is equipped with an electrical igniter and wherein the process of combustion automatically proceeds from the ignition phase to normal operation smoothly and without mechanical aid.

Another object is to provide a construction in which a cupped burner head is located at one end of a combustion chamber casing and opens into the same and accommodates a vapor generator, the burner head and generator being relatively shallow in the direction of the axis of the combustion chamber whereby the overall length of the combustion apparatus is held to the minimum, this being an important consideration in heaters of the class to which the invention pertains.

A further object is to provide a construction like that just described wherein the vapor generator and parts associated directly therewith are contained, practically entirely, within the burner head, thereby to leave the combustion chamber unobstructed from end to end so that combustion may prevail throughout the same and substantially the entire exterior of the combustion chamber casing utilized for heat radiation.

A further object is to so construct, relate and communicatively connect the burner head and vapor generator that the primary air and vapors will be thoroughly mixed within the burner head before being discharged, with the secondary air, into the combustion chamber.

A further object is to provide a construction that will project the combustible mixture of vapor and combustion-supporting air into the combustion chamber with a swirling action so as to permit combustion to take place efficiently and quietly over a wide range of fuel burning rates and substantially throughout the length of the combustion chamber and in intimate contact with the walls thereof.

A still further object is to provide a construction by which a small amount of the secondary air is directed against the wall of the combustion chamber at the entrance end thereof in order to cool the same and thereby prevent excessive conduction of heat to the burner head.

In the attainment of such control and direction of the secondary air, a so-called air ring or baffle is employed; and it is a further object to so relate said ring or baffle to the interior of the combustion chamber and to the vapor generator that a stable flame is produced and maintained, having a "flame front" somewhat removed from the burner head.

It is a further object to so locate the vapor generator or retort within the burner head, and to so project the mixture of vapor and combustion air forwardly about it, that the retort or generator operates at a relatively low temperature (in the neighborhood of 500° to 600° F.). At such a temperature, "plating out" of the lead compounds contained in certain gasolines, suitable as fuel for the burner, is avoided. This so-called "plating out" process, if permitted, would produce a residue of the lead compounds that would tend to clog the generator and fuel nozzle.

The foregoing objects, with such others as compactness and simplicity of structure, reliability of performance, durability, ease of assembly, and accessibility of parts, are attained in the embodiment of the invention illustrated in the accompanying drawings that form a part hereof and wherein like reference characters are used to designate like parts throughout the several views.

In the drawings,

Fig. 1 is a perspective view of my improved heating apparatus;

Fig. 2 is a central longitudinal section through the apparatus, with certain parts shown in elevation;

Figure 3:
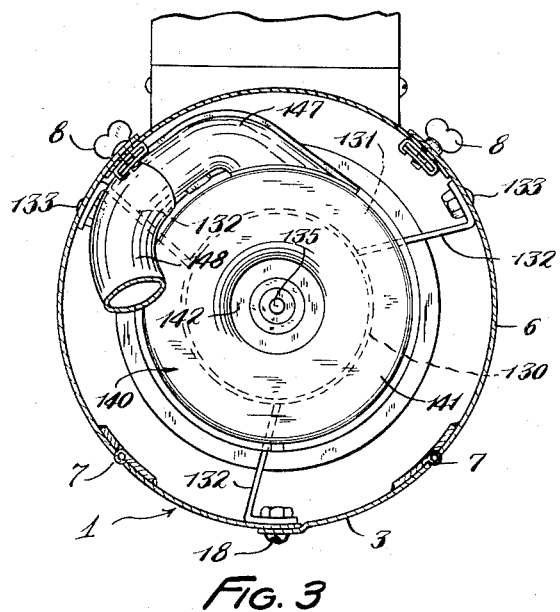
Figure 4:
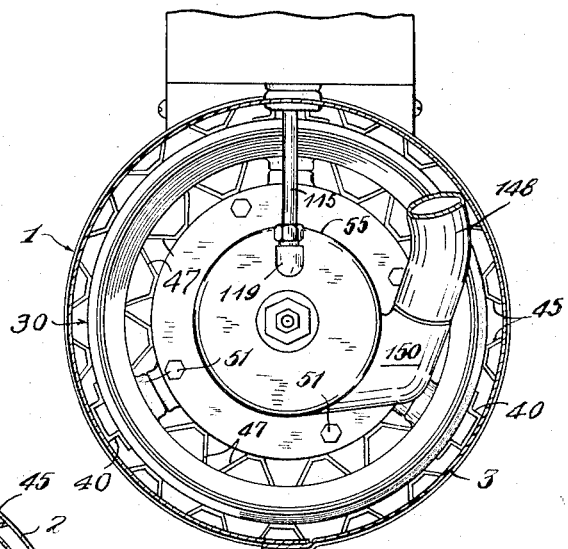
Figure 5:
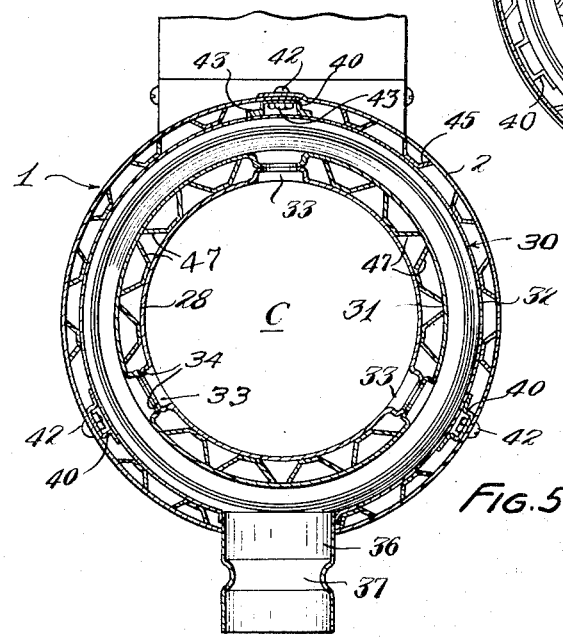
Figure 6:
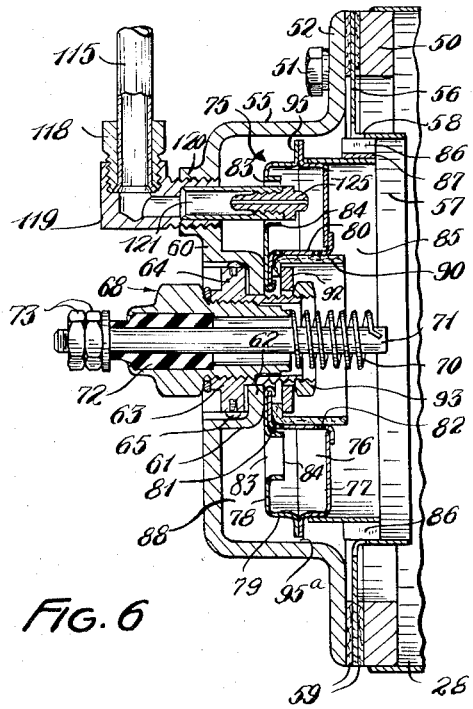
Figure 7:
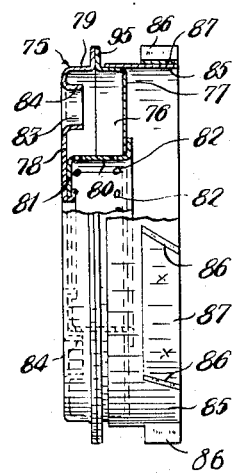
Figure 8:
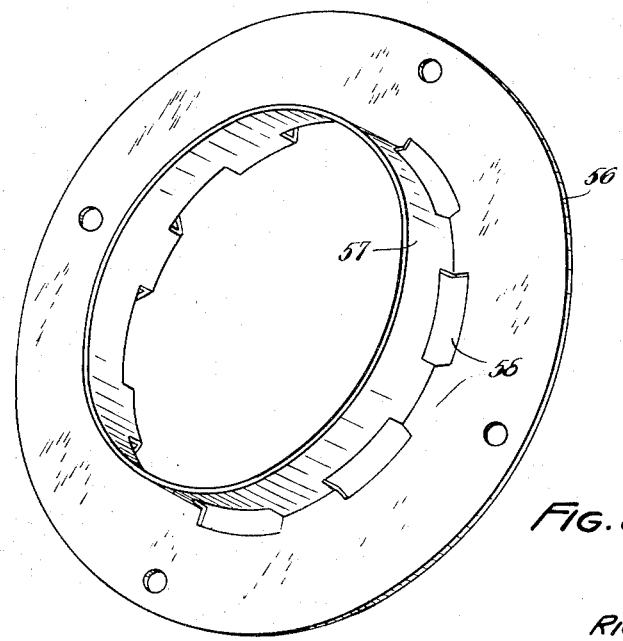

Figs. 3 and 4 are transverse sections on the line A—A of Fig. 2, looking in the direction of the arrows 3—3 and 4—4, respectively;

Fig. 5 is a transverse section on the line 5—5 of Fig. 2;

Fig. 6 is a central vertical section through the burner, drawn to a scale considerably larger than that of the preceding views;

Fig. 7 is a side elevational view, partly in section, of the retort or vapor generator;

Fig. 8 is a perspective view of the so-called air ring, and

Figure 9:
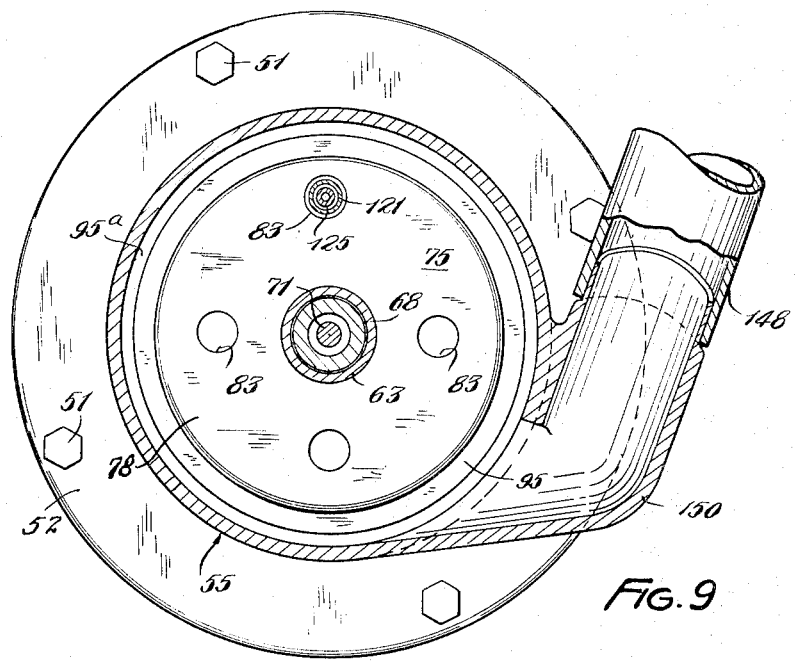
Figure 10:
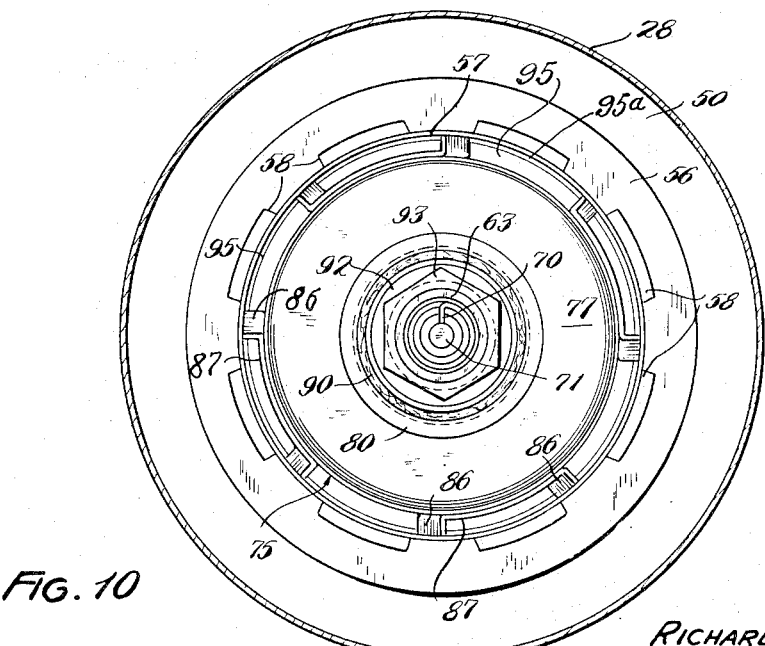

Figs. 9 and 10 are sections on the respective lines 9—9 and 10—10 of Fig. 2.

The casing of the heater, designated generally by the reference numeral 1, is cylindrical, and includes a front section 2, and a rear section 3, the forward end of the latter section telescoping within the adjacent end of the front section, and being held thereto by screws 4. The section 3 is provided with relatively large openings 5 on the opposite sides thereof, that are normally closed by doors 6. These doors are connected adjacent their lower edges to the wall of the section 3 by hinges 7. The doors are held in closed position by latch means 8.

The casing 1 terminates at its forward end in a frustoconical member 10, that is held to the adjacent end of the section 2 by screws 11; and an annular end member 15 is telescoped into the rear end of the section 3 and is held thereto by screws 16. The front section 2 and the rear section 3 of the casing are formed from rectangular pieces of sheet metal, the longitudinal edges of the former piece being overlapped along the top of the casing (considering the position occupied by the casing in the several views of the drawing), while the longitudinal edges of the other piece are overlapped at the bottom, where they are held together by screws 18, and by one of the previously mentioned screws 16. The inner edge portion of the annular end member 15 is curved inwardly and defines a relatively large central opening 20, and disposed across said opening and attached to said member is a screen 21, the edge portion of the screen being confined between said member and the rearwardly offset portion of a ring 23 that is welded or otherwise secured to the end member.

Surmounting the casing adjacent its rear end is a rectangular housing 25 that encloses parts of the fuel supply and metering system and elements of an electrical control means by which the operation of the heating apparatus is rendered automatic.

Occupying the front section 2 of the heater casing are a heat exchanger and a combustion chamber casing that I shall now describe. The latter is made up of a cylindrical wall 28, and a circular end wall 29, the end wall being shown as slightly dished and as having a peripheral flange that is secured, as by welding, to the wall 28. The space enclosed by these walls constitutes the combustion chamber C.

Surrounding the combustion chamber casing is a heat exchanger 30 that is made up of inner and outer cylindrical walls 31 and 32, respectively. These walls converge at their opposite ends and terminate in flanges that are welded together. The wall 28 of the combustion chamber casing and the inner wall 31 of the heat exchanger have registering openings 33 near their forward ends, shown as oblong and three in number, said openings being equally spaced apart in a circumferential direction. The material of each of said walls, about said openings, is extended toward the other wall and thence turned inwardly to provide planar flanges 34 that are engaged with each other and are welded together. This construction provides not only communicative, but strong mechanical connections between the combustion chamber casing and the heat exchanger. An outlet for the heat exchanger is provided by an opening 35 in the bottom of the wall 32 about which the material of said wall is flanged outwardly to receive the inner end of a spud 36 that is welded to said flange, the outlet of the heat exchanger being spaced rearwardly from the plane of the openings 33 a substantial distance. The spud 36, which is extended through an opening in the lower side of the casing 1, is generally of a diameter to receive a flexible conduit of standard size, and intermediate its ends it is shown as formed with a choke 37 that retards the flow of the products of combustion through the combustion chamber and heat exchanger in order to obtain the maximum amount of heat therefrom.

Channel members 40 are welded to the outer wall 32 of the heat exchanger, said members extending longitudinally of said wall and substantially from end to end thereof. Three such members are shown, and they are equally spaced apart about the heat exchanger, and screws 42 are extended through apertures in the casing section 2 and in the webs of the channel members 40 and are threaded into nuts 43 that are desirably attached to said members by welding. The screws 42 that are located at the top of the casing section 2 also extend through apertures in the overlapping edges of the casing section and serve the additional purpose of securing said edges together.

Attached, as by welding, to the outer surface of the wall 32 between the channel members 40 are troughshaped vanes 45. These vanes are substantially parallel with, and may be about the same length as the channel members 40, excepting where interrupted by the spud 36. Similar vanes 47 are attached to the peripheral wall 28 of the combustion chamber casing. These latter vanes extend to the inner wall 31 of the heat exchanger and are of approximately the same length as the cylindrical portion of said wall, excepting where shortened on account of the formation of the walls 28 and 31 about the openings 33.

Fitting within and welded to the rear end of the wall 28 of the combustion chamber is a relatively heavy metal ring 50 (Figs. 2, 6 and 10). Attached to this ring by screws 51 are the radial flange 52 of a cupped burner head 55, and the similar flange 56 of an air distributing ring 57. The body portion of said air distributing ring is cylindrical, and the ring is provided with a plurality of slots 58 at the angle between the body portion of said ring and the flange 56 thereof (see Fig. 8). Gaskets 59, of asbestos or other non-combustible material, are desirably interposed between the flanges 52 and 56, and between the latter flange and the ring 50.

The cupped burner head 55 is cylindrical, and it is formed centrally of its circular rear wall 60 with a reentrant portion 61 that terminates at its forward end in an annular flange 62. Projected through the opening defined by the flange 62 is the inner end of a sleeve 63, shown as having an integral collar 64 that fits within the reentrant portion 61 of the wall 60. The sleeve 63 may be held in any suitable manner against turning with respect to the burner head, as by having one or more buttons 65 secured to the edge of the collar 64, each received by a groove in the adjacent portion of the head. The sleeve 63 is externally threaded at its forward end, and internally threaded at its rear end; and screwed into the latter end of the sleeve is the threaded body of an electrical igniter, designated generally by the reference numeral 68. The igniter includes an electrical resistance heating element 70 that is grounded at one end to the body of the igniter, and at the other has connection with a metal stem 71 that extends through a central bore of the body and is insulated therefrom by a bushing 72 of suitable material. The outer end of the stem is threaded to receive nuts 73 and constitute a binding post of conventional character.

While I have disclosed the igniter as supported by and axially of the burner head, I wish it to be understood that I do not limit my invention to such an arrangement as obviously the igniter could be otherwise supported and disposed with respect to the burner head, the important consideration being that the heating element or coil of the igniter be located substantially at the center of the burner in juxtaposition to the head where it is out of the high velocity zone of the swirling stream of mixture and in the vortex thereof, so to speak, or in other words in the relatively quiet zone where it requires no shielding.

75 designates, generally, the retort or vapor generator (Figs. 6, 7, 10 and 11) and is desirably fabricated of sheet metal and designed to provide an annular structure enclosing a vapor generating chamber 76. The retort or generator includes a front wall 77, a rear wall 78 and an outer peripheral wall 79. This latter wall is constructed of cylindrical parts formed integral with the front and rear walls and they are flanged outwardly at their edges for engagement with each other and for suitable connection, as by welding. These flanges constitute an important feature of the burner, as will be brought out later. The inner cylindrical wall 80 of the generator consists of a part of a ring-like member that is flanged outwardly at its forward end for overlapping engagement with the adjacent edge portion of the wall 77, and that is flanged inwardly at its rear end for face contact with the underlying portion of the rear wall 78, the edge portion of the latter wall being crimped about the adjacent edge of the flanged rear end of said member. The flanged forward end of said member is secured, as by welding, to the front wall of the generator. The inner wall 80 is provided with openings that are shown as two series of holes, those of one series being designated 81, and those of the other, 82. The rear wall 78 is also provided with a plurality of relatively large vapor emitting openings 83 that are surrounded by flanges 84. These flanges extend into the vapor generating chamber a distance beyond the plane of said holes 81, for a reason later to be explained.

Engaged over the front end of the peripheral wall 79 of the vapor generator is a ring-like baffle 85 that has welded or otherwise secured to its exterior adjacent its front end a plurality of vanes 86. These vanes are preferably formed by the outwardly turned ends of arcuate straps of metal, designated 87, that are welded or otherwise secured to the baffle, said vanes being disposed at an angle to the axis of the generator, as best shown in Fig. 7.

The above described annular structure that constitutes the vapor generator is placed over the forwardly projecting end of the sleeve 63 and is engaged with the flange 62 of the burner head. In its mounted position the vapor generator is spaced forwardly from the rear wall 60 of the burner head and the space thus provided between said wall and the generator constitutes a mixing chamber 88. A tubular wick 90, of asbestos or other suitable material, fits within the space surrounded by the wall 80, and its inner end is crimped inwardly and is engaged by a washer 92. By means of a nut 93 that is threaded onto the sleeve 63 said washer and the crimped inner end of the wick, together with the vapor generator are held firmly against the flanged forward end of the reentrant portion 61 of the burner head.

The previously mentioned flanges that extend radially from the peripheral wall 79 of the vapor generator constitute a circumferential ridge 95 that closely approaches the surrounding wall of the burner head, when the head and generator are assembled as just described, thereby to provide an annular restricted passageway 95ª between said ridge and said surrounding wall.

130 denotes an electric motor that is supported centrally within the rear section 3 of the heater casing. In the present embodiment, the motor supporting means consists of a contractile band 131 that encircles the motor and is fabricated of sheet metal, and from which radiate three arms 132 (Fig. 3) that have their outer ends turned laterally for engagement with the wall of the casing section 3. The lower arm is secured to said wall by the two previously mentioned screws 18, and the other arms, by screws 133.

Fastened to the forward end of the motor shaft 135 is the hub 136 of an air wheel 137 that constitutes a part of the combustion air impeller designated generally by the reference numeral 140. The shell 141 of the impeller is circular and in its front wall is provided with a relatively large central opening 142 through which air is drawn into the shell when the wheel 137 is in action.

The rear wall 143 of the shell is fastened by bolts 144, to a member 145 that is secured to the front end of the motor casing. The shell 141 has an outlet extension 147 (Figs. 2 and 3) that communicates, through a conduit or hose 148, with an inlet boss or extension 150 of the burner head 55 (Figs. 2, 4 and 9).

It will be observed that the proximal end of the boss 150 is tangent to the peripheral wall of the burner head through which it opens. As a consequence, the incoming air is given a swirling action that causes a layer of air to follow said peripheral wall past the ridge 95 and enter the combustion chamber through the slots 58 of the air ring and between the body portion of said ring and the wall 28 of the combustion chamber. During normal operation, vapors created in the vapor generating chamber escape into the mixing chamber 88 through the openings 83 in the generator and are then thoroughly mixed with that portion of the air nearest the generator, herein designated primary air, and this mixture of vapors and primary air, passing over the ridge 95 and through the annular passageway 95ª, tends to follow a course into the combustion chamber between the air ring 57 and the baffle 85, a swirling action being imparted to said mixture by the vanes 86.

To the rear end of the shaft 135 of the motor is secured the hub 154 of what may be termed a fresh air wheel or impeller 155. When the motor 130 is operating, air is drawn in through the opening 20 by the action of the wheel or impeller 155 and, because of its being confined to the casing 1, the air is caused to travel forwardly. A part of this air wipes about the motor 130, keeping the motor relatively cool, and a part is drawn into the shell of the air impeller 140. The remainder continues past the heat exchanger and along the combustion chamber casing, among the several fins 45 and 47, becoming heated to a high degree before escaping from the casing through the member 10. Obviously this air may be distributed as desired—for example, to the personnel compartment of a conveyance—through suitable conduit means placed in communication with the outlet end of said member.

Although it forms no part of the present invention, it may be explained that an elongated thermostat is housed in a tube 160 that extends diametrically through the combustion chamber adjacent the burner head 55, the thermostat actuating a micro switch 161 that is a part of the electrical control means by which the action of the apparatus is rendered automatic.

Attention is also directed to the fact that the doors 6 afford convenient access to the burner head, igniter and combustion air impeller 140; and by removing the screws 16 that hold the end member 15 in place, said member may be withdrawn from the end of the casing section 3 thereby to permit the air wheel or impeller 155 to be easily reached, as well as the brushes of the motor, one of which is shown at 163 in Fig. 2.

As is well known to those acquainted with the art, the electrical control means to which reference has been made includes a thermostat that is subjected to the temperature of a space to be heated and which operates a switch to close a circuit when the temperature affecting such thermostat falls below a temperature range for which the thermostat is set. Upon the closing of such circuit, the resistance element 70 of the igniter is energized to cause the same to become highly heated or incandescent. In timed relation thereto, liquid fuel is fed to the burner through a system including a filter 96 (Fig. 2), having inlet and outlet connections 97 and 100, respectively, and a pipe 115 that leads from the outlet connection 100 and is coupled by a fitting 118 (Fig. 6) to one branch of an L 119. The other branch of the L is threaded into a boss 120 that projects from the rear wall 60 of the burner head 55 in axial alignment with one of the openings 83 of the vapor generator 75. Said other branch of the L 119 is counterbored to tightly receive a tube 121 that projects into the aligned opening of the vapor generator in spaced relation to the surrounding flange 84, and threaded into the inner end of said tube 121 is the body portion of a fuel nozzle 125. The fuel is drawn from a suitable source by means of a pump whose operation is controlled by the aforesaid electrical means, and as the fuel issues in a stream from the nozzle 125, it impinges against the wall 77 of the vapor generator. Since the parts are cool, the liquid fuel will drain from said wall and pass through certain of the openings 81 and 82 of the inner wall 80 and saturate the wick 90. The heat from the element 70 of the igniter will vaporize and ignite this fuel and it will burn adjacent the generator wall 77 and largely within the space enclosed by the baffle 85. It will be noted that the igniter element 70 and wick 90 are located in the low pressure region at the center of the burner head and therefore are not affected by the relatively high velocity stream of vapor and air. This condition insures easy ignition without the necessity of shielding the igniter, as is required in many prior burners. Ignition of the fuel results in a rapid heating of the generator, and more especially the wall 77 thereof, so that soon after the burner is started the liquid fuel issuing from the nozzle 125 will flash into vapor, which action is promoted by atomization of the fuel due to its impingement against the wall 77, and the vapors will escape through the openings 83 to the mixing chamber 88 enclosed by the burner head and, commingling with the adjacent part of the combustion air (primary air) supplied by the combustion air impeller 140, will flow through the annular passageway 95ª toward the combustion chamber C. As this primary fuel mixture emerges from said passageway 95ª, it is diluted with additional combustion, or, as it may be termed "secondary" air which passes directly from the combustion air inlet opening into the burner head on the combustion chamber side of said passageway 95ª. The resultant highly combustible mixture has a relatively high rotational velocity due to the tangential injection of the combustion air. However, the rotational velocity of this mixture is reduced (but not eliminated) and an axial velocity is imparted to it by the vanes 86 as the mixture passes across these vanes and enters the combustion chamber within the confines of the flange 57 of the air mixing ring 56. It is a further function of the vanes 86 to promote the final mixing of the primary fuel mixture and the secondary air. The flange 57 of the air mixing ring 56 projects a short distance into the combustion chamber and acts to prevent the flame from impinging against the combustion chamber wall in the immediate vicinity of the burner end thereof. The air mixing ring 56 is provided with air slots 58 that allow a limited amount of secondary air to enter the combustion chamber in the immediate vicinity of the burner end thereof in order to cool the surrounding part of the combustion chamber wall and thereby prevent the burner head from becoming overheated by conduction of heat from the proximate end of said wall.

It will be evident that when the heater is operating in its normal phase, i. e., after the ignition period has been completed, the entire combustion chamber is filled with flame and the "flame front," i. e., the point at which flame is initiated, is located a short distance from the edge of the air mixing ring flange 57. Thus a very desirable flame condition exists, with the generator 75 at all times remote from the flame but under its direct influence, so that it is kept at a uniform but controlled elevated temperature sufficiently high to assure proper vaporization of the fuel therein but not so high as to cause "platting out" of the lead compounds from certain fuels the burner is sometimes required to burn. It will be understood, of course, that the products pass from the combustion chamber through the openings 33 into the heat exchanger and are diffused throughout the interior thereof before escaping through the spud 36 and conduit means (not shown) connected thereto and by which the hot products may be conveyed to the engine of the conveyance and other parts of the power plant.

In the event combustion is momentarily interrupted, as from a temporary deficiency in the supply of fuel or air rendering the mixture too lean or too rich for combustion, the mixture, upon regaining a combustible condition, will reignite from the projecting end of the wick 90 that maintains an igniting temperature, or incandescence, during normal operation of the apparatus.

As stated early herein, the apparatus is capable of operation in an upright position—that is, with its longitudinal axis substantially vertical and the combustion chamber above the burner head—and in inverted position—with the burner head above the combustion chamber—or in any position intermediate these two extremes. The only thing appreciably affected by a change of position is the gravitational flow of liquid fuel in the vapor generating chamber. When the apparatus is arranged with its longitudinal axis horizontal, as shown in the drawings, the liquid fuel, after projection against the wall 77 of the vapor generator, flows down said wall and at least a part of it will pass through certain of the holes 81 and 82 to the wick 90, saturating the wick for starting purposes, as hereinbefore explained.

When the apparatus is in an upright position, the liquid fuel will collect upon the now horizontal wall 78 of the vapor generator and reach the wick through the holes 81 which, as previously brought out, are below the inner ends of the flanges 84. When the apparatus is inverted, the reverse of the foregoing will occur and the fuel will reach the wick through the holes 82. It will be evident, therefore, that, regardless of the position of the apparatus, the liquid fuel will be contained by the vapor generator and reach the wick 90 through some of the holes 81 and 82. Under any of these circumstances, ignition will occur as first described, and combustion will proceed from the ignition stage to normal operation as the generator is heated sufficiently to convert the liquid fuel to vapor.

Having thus described my invention, what I claim is:

1. In heating apparatus, a combustion chamber casing, a cupped burner head opening into said casing, an electrical resistance igniter projecting substantially axially into the burner head, an annular hollow vapor generator located within the burner head in spaced relation to the closed end and peripheral portion thereof and surrounding the igniter in radially spaced relation thereto, a tubular wick encircling the igniter and fitting within the annulus constituted of the generator, means for delivering liquid fuel to the generator, the generator having fuel passage means through which liquid fuel escapes therefrom to the wick and being provided with vapor outlet means so disposed as to deliver vapor to the burner head on the side of the generator remote from the combustion chamber casing, and means including an air impeller for supplying combustion air to the burner head.

2. In heating apparatus, a casing enclosing a combustion chamber, a cupped burner head attached to said casing and opening into the combustion chamber, the burner head having an end wall remote from said chamber, an electrical resistance igniter projecting axially into the burner head through an aperture in said end wall, an annular hollow vapor generator surrounding the igniter in radially spaced relation thereto and axially spaced from said end wall, a tubular wick encircling the igniter in spaced relation thereto and fitting within the annulus constituted of the generator, the generator including a wall underlying said wick, said underlying wall having holes through which liquid fuel escapes from the vapor generator to the wick, means for delivering liquid fuel to the vapor generator, the burner head including a peripheral wall spaced radially from the peripheral portion of the generator to provide an annular passage therebetween, the generator including a further wall having vapor outlet openings leading into the burner head and surrounded by flanges that extend into the generator a distance beyond the plane of certain of the aforesaid holes, and means including an air impeller for delivering air to the burner head.

3. In heating apparatus, a casing enclosing a combustion chamber, a cupped burner head attached to said casing and opening into the combustion chamber, an electrical resistance igniter projecting axially into the burner head, an annular hollow vapor generator surrounding the igniter in radially spaced relation thereto, the burner head including a cylindrical wall in outwardly spaced relation to the periphery of the generator thereby to provide an annular passage between said wall and the generator, the interior of the burner head rearwardly of the generator constituting a mixing chamber, a tubular wick encircling the igniter in spaced relation thereto and fitting within the annulus constituted of the generator, the generator including a wall underlying said wick and provided with fuel passage means, means for delivering liquid fuel to the vapor generator, the generator being provided with vapor outlet means that opens into the aforesaid mixing chamber, an air ring disposed circumferentially of the burner head between it and the combustion chamber, said ring having circumferentially spaced openings, an air impeller, and communicative connections through which air is delivered from the impeller to said mixing chamber.

4. In heating apparatus, a casing enclosing a combustion chamber, a cupped burner head attached to said casing and opening into the combustion chamber, an electrical resistance igniter projecting axially into the burner head, an annular hollow vapor generator surrounding the igniter in radially spaced relation thereto, the burner head including a cylindrical wall in outwardly spaced relation to the periphery of the generator, a circumferential ridge extending radially from the generator toward said cylindrical wall thereby to provide an annular passage between said wall and the ridge, the interior of the burner head rearwardly of the generator constituting a mixing chamber, a tubular wick encircling the igniter in spaced relation thereto and fitting within the annulus constituted of the generator, the generator including a wall underlying said wick and provided with fuel passage means, means for delivering liquid fuel to the vapor generator, the generator being provided with vapor outlet means that opens into the aforesaid mixing chamber, a cylindrical baffle extending from the peripheral portion of the generator in the direction of the combustion chamber, a plurality of vanes on the exterior of said baffle that are inclined to the axis of the generator, an air ring disposed circumferentially of the burner head between it and the combustion chamber, said ring having circumferentially spaced openings, an air impeller, and communicative connections through which air is delivered from the impeller to the interior of the burner head adjacent and tangent to the peripheral wall thereof.

5. In heating apparatus, a casing including a cylindrical wall enclosing a combustion chamber, a cupped burner head applied to the casing and opening into the combustion chamber, said head including a cylindrical peripheral wall substantially concentric with the aforesaid wall of the casing, an electrical resistance igniter projecting axially into the burner head, an annular hollow vapor generator surrounding the igniter in radially spaced relation thereto and the periphery of which is spaced from the cylindrical wall of the burner head, the interior of the burner head on the side of the generator remote from the combustion chamber constituting a mixing chamber, the generator including a wall adjacent said chamber having vapor outlet means, a wick adjacent the igniter and disposed within the annulus constituted of the generator, the generator having passage means through which liquid fuel escapes from the generator to the wick, means for supplying liquid fuel to the generator, an air impeller, and communicative connections between the latter and the mixing chamber of the burner head.

6. The combination and arrangement of parts defined by claim 5, and a cylindrical baffle extending from the peripheral portion of the generator in the direction of the combustion chamber.

7. The combination and arrangement of parts defined by claim 5, and, in addition thereto, a cylindrical baffle extending from the peripheral portion of the generator in the direction of the combustion chamber, and a plurality of vanes radiating from said baffle and inclined to the axis thereof.

8. The combination and arrangement of parts defined by claim 5, and an air distributing ring between the burner head and combustion chamber concentric with the peripheral wall of the burner head and in substantial alignment therewith, said air distributing ring being provided with passage means for admitting air from the burner head to the combustion chamber in the region of the cylindrical wall of the latter.

9. In heating apparatus, a casing including a cylindrical wall enclosing a combustion chamber, a cupped burner head applied to said casing and opening into the combustion chamber, said head including a cylindrical peripheral wall substantially concentric with the aforesaid wall of the casing, an electrical resistance igniter projecting axially into the burner head, an annular hollow vapor generator surrounding the igniter in radially spaced relation thereto and the periphery of which is spaced from the cylindrical wall of the burner head, the interior of the burner head on the side of the generator remote from the combustion chamber constituting a mixing chamber, the generator including a wall adjacent said chamber having vapor outlet means, a tubular wick encircling the igniter in spaced relation thereto and fitting within the annulus constituted of the generator, the generator having passage means through which liquid fuel escapes from the generator to the wick, means for supplying liquid fuel to the generator, the generator including a wall exposed to the interior of the combustion chamber, the fuel delivery means including a nozzle disposed to project the fuel against the last mentioned wall, an air impeller, and communicative connections between said impeller and the mixing chamber of the burner head.

10. In heating apparatus, a combustion chamber casing, a cupped burner head opening into said casing and having a peripheral wall and an end wall, a hollow vapor generator positioned in said head in spaced relation to said end wall so as to provide between it and said end wall a mixing chamber, the periphery of the generator being spaced from the peripheral wall of the burner head to provide therebetween a passageway through which said mixing chamber communicates with the interior of the combustion chamber casing, means for delivering liquid fuel to the vapor generator, said generator being provided with vapor outlet means opening into the aforesaid mixing chamber, a wick operatively associated with the generator and in communication with the interior thereof and exposed to the interior of the combustion chamber casing, electrical ignition means of the resistance type in fuel vaporizing and igniting relation to said wick and positioned substantially centrally of the burner head, and means for supplying air to said mixing chamber and passageway.

11. In heating apparatus, a combustion chamber casing, a cupped burner head opening into said casing and having a peripheral wall and an end wall, a hollow vapor generator positioned in said head in spaced relation to said end wall so as to provide between it and said end wall a mixing chamber, the periphery of the generator being spaced from the peripheral wall of the burner head to provide therebetween a passageway through which said mixing chamber communicates with the interior of the combustion chamber casing, means for delivering liquid fuel to said generator, the generator being provided with vapor outlet means opening into the aforesaid mixing chamber, a wick operatively associated with the generator and in communication with the interior thereof and exposed to the interior of the combustion chamber casing, electrical ignition means of the resistance type in fuel vaporizing and igniting relation to said wick and positioned substantially centrally of the burner head, a combustion air impeller, and means for delivering air from said impeller to the aforesaid mixing chamber and to said passageway adjacent to the combustion chamber casing.

References Cited in the file of this patent

UNITED STATES PATENTS

| | | |
|---|---|---|
| 2,203,284 | Moody et al. | June 4, 1940 |
| 2,286,853 | Holthouse | June 16, 1942 |
| 2,356,838 | Farrell | Aug. 29, 1944 |
| 2,443,707 | Korsgren | June 22, 1948 |
| 2,445,341 | Trimble et al. | July 20, 1948 |
| 2,447,373 | Smoot | Aug. 17, 1948 |
| 2,474,687 | Parrish | June 28, 1949 |
| 2,489,716 | McCollum | Nov. 29, 1949 |
| 2,494,785 | Tramontini | Jan. 17, 1950 |
| 2,501,593 | Becker | Mar. 21, 1950 |
| 2,579,507 | MacCracken | Dec. 25, 1951 |
| 2,603,281 | Frankland | July 15, 1952 |
| 2,664,312 | Czarnecki et al. | Dec. 29, 1953 |
| 2,712,352 | Manor et al. | July 5, 1955 |